(12) United States Patent
Tian et al.

(10) Patent No.: US 12,706,781 B2
(45) Date of Patent: Aug. 11, 2026

(54) AI-BASED CHANNEL ESTIMATION METHOD AND APPARATUS

(71) Applicant: GUANGDONG OPPO MOBILE TELECOMMUNICATIONS CORP., LTD., Dongguan (CN)

(72) Inventors: Wenqiang Tian, Dongguan (CN); Wendong Liu, Dongguan (CN); Han Xiao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 309 days.

(21) Appl. No.: 18/475,143

(22) Filed: Sep. 26, 2023

(65) Prior Publication Data

US 2024/0022455 A1 Jan. 18, 2024

Related U.S. Application Data

(63) Continuation of application No. PCT/CN2021/084180, filed on Mar. 30, 2021.

(51) Int. Cl.
*H04L 25/02* (2006.01)

(52) U.S. Cl.
CPC ...... *H04L 25/0254* (2013.01); *H04L 25/0204* (2013.01); *H04L 25/0224* (2013.01)

(58) Field of Classification Search
CPC ............. H04L 25/0254; H04L 25/0204; H04L 25/0224
See application file for complete search history.

(56) References Cited

U.S. PATENT DOCUMENTS

2020/0343985 A1 10/2020 O'Shea et al.

FOREIGN PATENT DOCUMENTS

| | | |
|---|---|---|
| CN | 109218233 | 1/2019 |
| CN | 109617847 | 4/2019 |
| CN | 110719240 | 1/2020 |
| WO | 2019229977 | 12/2019 |
| WO | 2021051362 | 3/2021 |

OTHER PUBLICATIONS

Saikrishna et al., "Deep Learning Based Channel Estimation with Flexible Delay and Doppler Networks for 5G NR," IEEE Wireless Communications and Networking Conference (WCNC), Mar. 29, 2021.
Elbir et al., "A Family of Deep Learning Architectures for Channel Estimation and Hybrid Beamforming in Multi-Carrier mm-Wave Massive MIMO," arXiv: 1912.10036v4, Feb. 18, 2021.
EPO, Extended European Search Report for EP Application No. 21933696.3, Apr. 16, 2024.
WIPO, International Search Report and Written Opinion for International Application No. PCT/CN2021/084180, Dec. 22, 2021.

*Primary Examiner* — Natasha W Cosme
(74) *Attorney, Agent, or Firm* — Hodgson Russ LLP

(57) ABSTRACT

An artificial intelligence (AI)-based channel estimation method and apparatus are provided. The method includes the following. A first reference signal is obtained, where the first reference signal is used for channel estimation of a first channel. The first reference signal is processed with an AI-based estimation model, to obtain a channel-estimation result of the first channel.

17 Claims, 13 Drawing Sheets

OBTAIN FIRST REFERENCE SIGNAL, WHERE FIRST REFERENCE SIGNAL IS USED FOR CHANNEL ESTIMATION OF FIRST CHANNEL — 201

PROCESS FIRST REFERENCE SIGNAL WITH AI-BASED ESTIMATION MODEL, TO OBTAIN CHANNEL-ESTIMATION RESULT OF FIRST CHANNEL — 202

OBTAIN CHANNEL-ESTIMATION RESULT OF FIRST CHANNEL

301

PERFORM CHANNEL RECOVERY BASED ON CHANNEL-ESTIMATION RESULT OF FIRST CHANNEL TO OBTAIN INITIAL CHANNEL-RECOVERY RESULT

3021

INPUT INITIAL CHANNEL-RECOVERY RESULT INTO FIRST AI RECOVERY MODEL FOR OPTIMIZATION, TO OBTAIN CHANNEL-RECOVERY RESULT

3022

800
CHANNEL ESTIMATION AND RECOVERY APPARATUS
OBTAINING UNIT
801
PROCESSING UNIT
802

AI-BASED CHANNEL ESTIMATION METHOD AND APPARATUS

CROSS-REFERENCE TO RELATED APPLICATION(S)

This application is a continuation of International Application No. PCT/CN2021/084180, filed Mar. 30, 2021, the entire disclosure of which is incorporated herein by reference.

TECHNICAL FIELD

This disclosure relates to the field of communications technology, and more particularly to an artificial intelligence (AI)-based channel estimation method and apparatus.

BACKGROUND

A basic working procedure of a wireless communication system is that a transmitter performs operations such as encoding, modulation, and encryption on a source at a transmitting end to obtain information to be transmitted. The information is then transmitted to a receiving end through a wireless space, and the receiving end performs operations such as decoding, decryption, and demodulation on received information and finally recovers source information.

In information transmission, channel environment and whether current channel environment can be estimated accurately are crucial to performance of the wireless communication system. Generally, when designing a wireless communication system, a transmitting end (for example, a network device) transmits some pilot signal to assist a receiving end (for example, a terminal) in obtaining and estimating a current channel feature, then the terminal can feed back corresponding channel information to the network device based on an estimated or recovered channel feature, and finally, the network device performs corresponding operations such as encoding and modulation according to the channel information obtained.

Although pilot channel-based channel estimation and recovery can be realized to some extent with aid of a traditional channel estimation algorithm, due to significant characteristics such as complexity, non-linearity and time varying of an actual channel, it is hard to obtain an optimal channel estimation and recovery result as required if a traditional method is adopted. In this case, selection of communication mechanism as well as data transmission performance will be affected due to an inaccurate channel estimation and recovery result.

SUMMARY

In a first aspect, an AI-based channel estimation method is provided in implementations of the disclosure. The method includes the following. A first reference signal is obtained, where the first reference signal is used for channel estimation of a first channel. The first reference signal is processed with an AI-based estimation model, to obtain a channel-estimation result of the first channel.

In a second aspect, an electronic device is provided in implementations of the disclosure. The electronic device includes a processor, a memory, a transceiver, and one or more programs. The one or more programs are stored in the memory and configured to be executed by the processor. The programs include instructions for performing steps of the method in the first aspect of implementations of the disclosure, or instructions for performing steps of the method in the second aspect of implementations of the disclosure.

BRIEF DESCRIPTION OF THE DRAWINGS

The following will briefly introduce the accompanying drawings used for describing implementations or the related art.

DETAILED DESCRIPTION

The following will describe technical solutions of implementations of the disclosure with reference to the accompanying drawings.

Figure 1A:
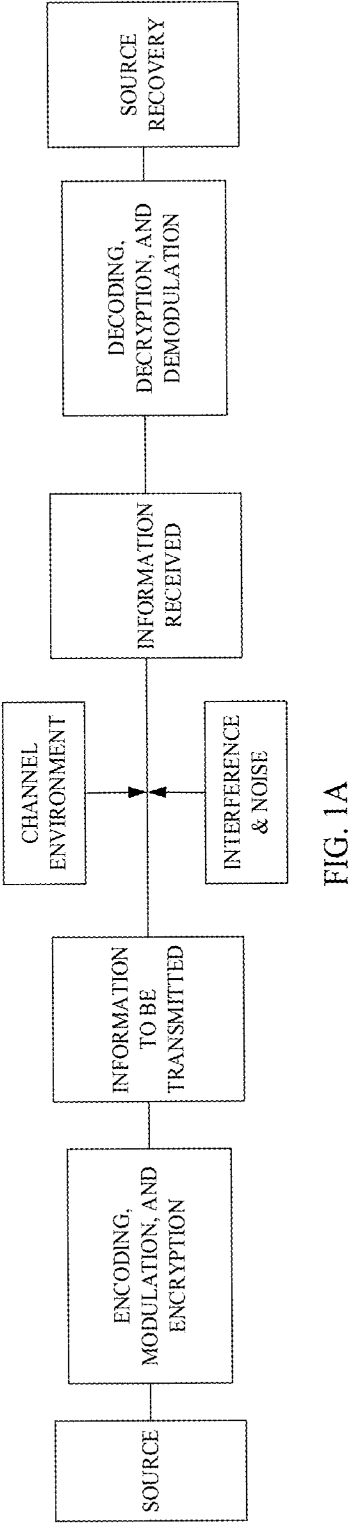
FIG. 1A illustrates a communication system architecture provided in implementations of the disclosure.

FIG. 1A illustrates a communication system architecture involved in the disclosure. As illustrated in FIG. 1A, a working procedure of a wireless communication system is that a transmitter performs operations such as encoding, modulation, and encryption on a source at a transmitting end to obtain information to be transmitted. The information is then transmitted to a receiving end through a wireless space, and the receiving end performs operations such as decoding, decryption, and demodulation on received information and finally recovers source information.

In the basic communication system architecture above, channel environment and whether current channel environment can be estimated accurately are crucial to performance of the wireless communication system. Generally, when designing a wireless communication system, a transmitting end (for example, a network device) transmits some pilot signal, for example, a channel-state information reference signal (CSI-RS), a demodulation reference signal (DMRS), a phase-tracking reference signal (PTRS), or a synchronization signal block (SSB) signal, so as to assist a receiving end (e. g. a terminal) in obtaining and estimating a current channel feature. Then the terminal can feed back corresponding channel information to the network device based on an estimated or recovered channel feature, and finally, the network device performs corresponding operations such as encoding and modulation according to the channel information obtained.

Figure 1B:
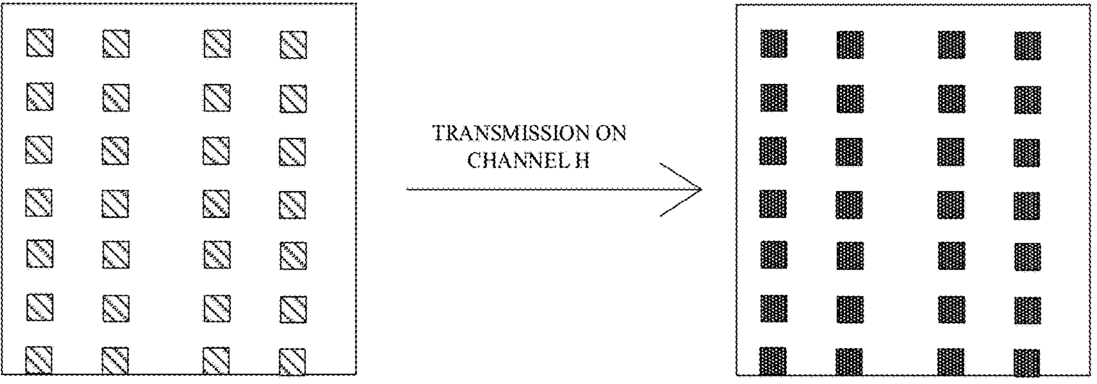
FIG. 1B is a schematic diagram illustrating pilot-signal transmission provided in implementations of the disclosure.

FIG. 1B is a schematic diagram illustrating pilot-signal transmission provided in implementations of the disclosure. As illustrated in FIG. 1B, a network device transmits a pilot signal (a specific reference signal), the pilot signal is received at a receiving end through channel propagation, and a user at the receiving end can estimate, based on a received pilot signal and an actual pilot signal, a condition of the channel on which the pilot signal is propagated. A basic channel estimation method includes a minimum mean square error (MMSE) algorithm, etc. After obtaining channel information corresponding to the pilot signal, a terminal or a base station can recover channel information in each slot of a full bandwidth by means of a basic method such as interpolation, and then perform corresponding operations such as channel quality feedback, data scheduling, etc.

The network device described above may be a base station. The base station may be configured to communicate with one or more terminals, or may be configured to communicate with one or more base stations having some terminal functions (for example, communication between a macro base station and a micro base station such as access point (AP)). The base station may be a base transceiver station (BTS) in a time division synchronous code division multiple access (TD-SCDMA) system, or may be an evolutional Node B (eNB) in a long term evolution (LTE) system, or may be a gNB in a $5^{th}$ generation (5G) system or a new radio (NR) system. In addition, the base station may also be an AP, a transmission reception point (TRP), a central unit (CU), or other network entities, and may have some or all functions of the above network entities. The terminal may be a mobile device (such as a smartphone), a mobile station, a mobile unit, a machine-to-machine (M2M) terminal, a wireless unit, a remote unit, a user agent, a user equipment (UE), a mobile client, and the like.

Figure 1C:
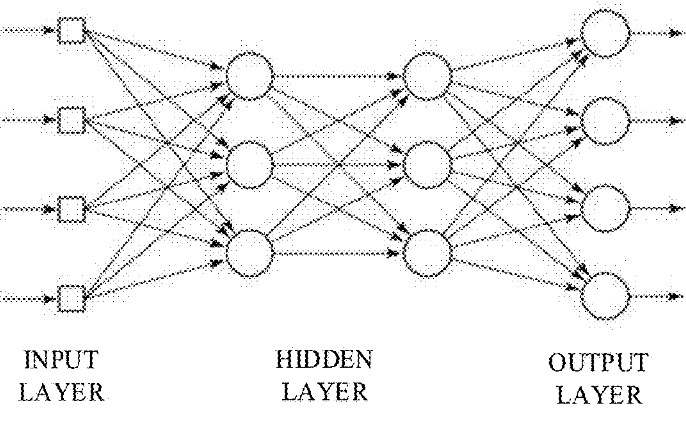
FIG. 1C is a schematic structural diagram of an artificial neural network provided in implementations of the disclosure.

FIG. 1C is a schematic structural diagram of an artificial neural network provided in implementations of the disclosure. As illustrated in FIG. 1C, the structure includes an input layer, a hidden layer, and an output layer. The input layer is responsible for data reception, the hidden layer is responsible for data processing, and a final result is generated at the output layer. In this structure, each node represents a processing unit and can be considered as simulating a neuron, multiple neurons construct a layer of neural network, and multiple layers of information transfer and processing construct an integrated neural network.

With continuous development of research on neural network, a neural network deep learning algorithm is proposed in recent years, where more hidden layers are introduced. Feature learning is performed through layer-wise training on a multi-hidden layer neural network, which greatly improves learning and processing capability of the neural network and realizes wide application in various aspects such as pattern recognition, signal processing, optimization and combination, and abnormality detection.

Figure 1D:
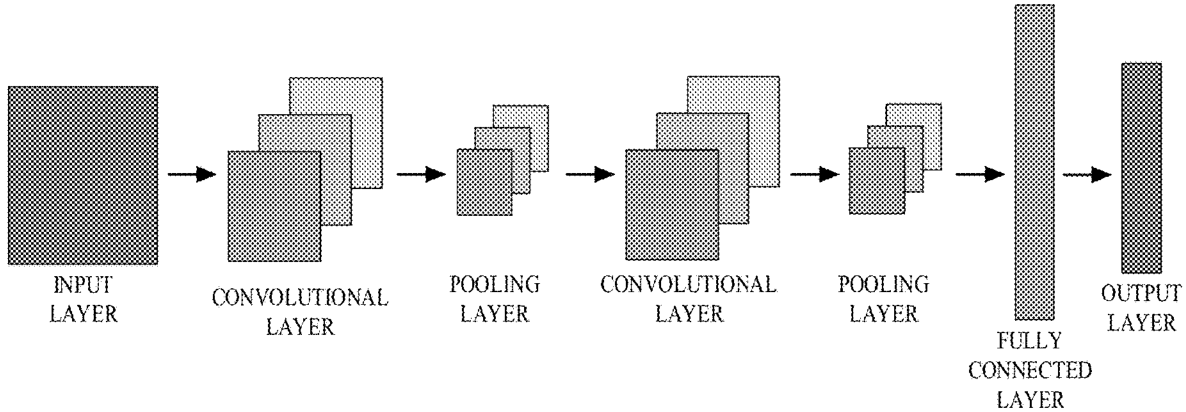
FIG. 1D is a schematic structural diagram of a convolutional neural network (CNN) provided in implementations of the disclosure.

Likewise, with development of deep learning, a convolutional neural network (CNN) is further studied. FIG. 1D is a schematic structural diagram of a CNN provided in implementations of the disclosure. As illustrated in FIG. 1D, a basic structure of a CNN includes: an input layer, multiple convolutional layers, multiple pooling layers, a fully connected layer, and an output layer. With introduction of the convolutional layer and the pooling layer, it is possible to effectively control proliferation of network parameters, limit the number (that is, quantity) of parameters, mine local features, and improve robustness of an algorithm. In addition, new network model and structure designs, such as a long short term memory network (LSTM), a transformer network, and an attention mechanism, are continuously proposed and well applied in many fields.

As can be seen from the above illustration, although pilot channel-based channel estimation and recovery can be realized to some extent with aid of a traditional channel estimation algorithm (e. g. MMSE algorithm, etc.), due to significant characteristics such as complexity, non-linearity, and time varying of an actual channel, it is hard to obtain an optimal channel estimation and recovery result as required if a traditional method is adopted. In this case, selection of communication mechanism as well as data transmission performance will be affected due to an inaccurate channel estimation and recovery result. At the same time, artificial intelligence (AI) is increasingly more developed and is more and more widely applied.

Implementations of the disclosure provide an artificial intelligence (AI)-based channel estimation method and apparatus, which can obtain a channel-estimation result by processing a reference signal for a channel with an AI model, thereby effectively improving channel estimation performance.

Figure 2A:
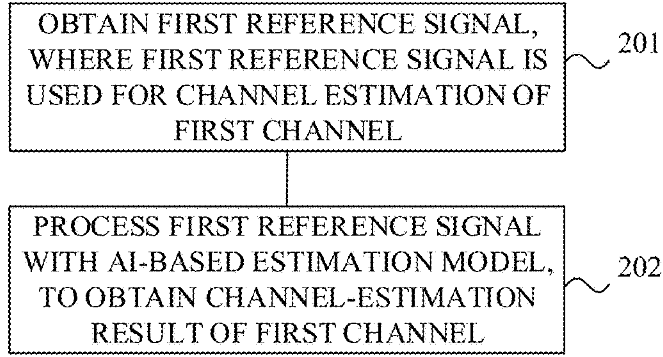
FIG. 2A is a flowchart of an artificial intelligence (AI)-based channel estimation method provided in implementations of the disclosure.

To this end, referring to FIG. 2A, FIG. 2A is a flowchart of an AI-based channel estimation method provided in implementations of the disclosure. As illustrated in FIG. 2A, the method includes the following.

201, a first reference signal is obtained, where the first reference signal is used for channel estimation of a first channel.

202, the first reference signal is processed with an AI-based estimation model, to obtain a channel-estimation result of the first channel.

In implementations of the disclosure, the first reference signal is processed with the AI-based estimation model to obtain the channel-estimation result of the first channel, that is, a reference signal is processed with an AI model in order for channel estimation. Since the model has characteristics of strong learning capability and strong generalization capability, if channel estimation is performed with the model, it is possible to effectively improve channel estimation performance, and then an optimal scheduling transmission scheme can be determined based on the channel feature, thereby obtaining a maximum network performance gain.

In implementations of the disclosure, a transmitting end transmits an original reference signal, where the transmitting end may be a network device or a terminal, and the original reference signal transmitted may be a CSI-RS, a DMRS, etc. A receiving end obtains a received reference signal, where the receiving end may be a terminal device or another network device. During transmission of the original reference signal S_t on the first channel, since some change occurs to the original reference signal S_t during transmission on the channel, a reference signal actually received by the receiving end is the received reference signal S_r. In addition, the receiving end can obtain the original reference signal based on protocol definition, network configuration, or in other manners.

For the convenience of illustration, the receiving end is exemplarily a terminal, and the transmitting end is exemplarily a network device. In a traditional method, after obtaining the received reference signal S_r and the original reference signal S_t, the terminal can estimate channel H_RS corresponding to a current reference signal according to an association between the above two signals. The method may be, for example, an MMSE method, etc. If such method is adopted, channel-estimation result will be low in accuracy in case the received reference signal and the original reference signal are in a non-linear relationship.

In implementations of the disclosure, channel estimation is performed with the AI-based estimation model, which specifically includes the following. The first reference signal is obtained, and the first reference signal is inputted into the AI-based estimation model for processing, so as to obtain the channel-estimation result of the first channel. The first reference signal may be the original reference signal transmitted by the transmitting end, or may be the received reference signal received by the receiving end, or may be the original reference signal and the received reference signal. The AI-based estimation model is a channel estimation model obtained through AI training, and may specifically be a CNN model, a clustering model, or the like. The channel-estimation result can be obtained by inputting data into the AI-based estimation model. Channel estimation implemented with the AI-based estimation model may be performed by the transmitting end, that is, the transmitting end performs channel estimation on the first channel to obtain the channel-estimation result and then sends the channel-estimation result to the receiving end. Alternatively, channel estimation implemented with the AI-based estimation model may be performed by the receiving end, that is, after receiving the first reference signal, the receiving end performs channel estimation on the first channel with the AI-based estimation model, to obtain the channel-estimation result.

Since an AI model has a stronger generalization capability and is well-fitted for a nonlinear channel, a more accurate channel-estimation result can be obtained if channel estimation is performed with such model, and if signal scheduling is subsequently performed based on the channel-estimation result, network performance can be greatly improved.

Figure 2B:
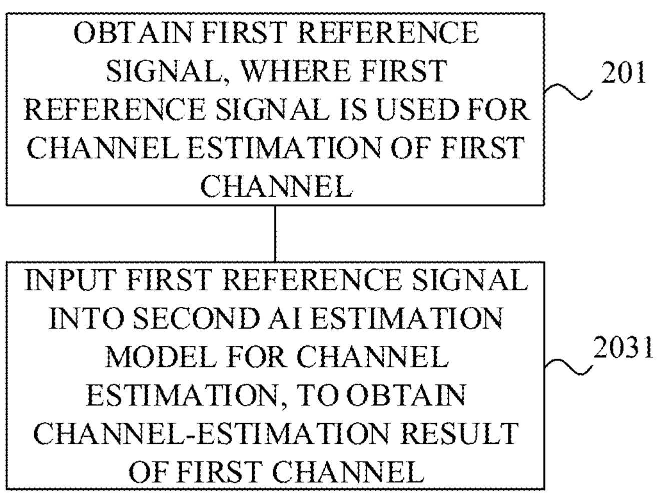
FIG. 2B is a flowchart of another AI-based channel estimation method provided in implementations of the disclosure.

Optionally, the AI-based estimation model is a second AI estimation model. As illustrated in FIG. 2B, the first reference signal is processed with the AI-based estimation model as follows. Step 2031, the receiving end inputs the first reference signal into the second AI estimation model for channel estimation, to obtain the channel-estimation result of the first channel.

In implementations of the disclosure, channel estimation is performed based on the first reference signal with the second AI estimation model, to obtain the channel-estimation result of the first channel. That is, input data of the model is the first reference signal, and output data is directly the channel-estimation result. The AI-based estimation model may be a CNN model. The channel-estimation result may specifically include a time response or a frequency response of a channel, and received data can be corrected and recovered to obtain a performance gain of coherent detection.

Optionally, the method further includes training to obtain the second AI estimation model, which specifically includes the following. A second training data set is obtained, where the second training data set is multiple historical first reference signals. The second training data set is inputted into a second initial estimation model for processing, to obtain predicted channel-estimation results. The predicted channel-estimation results and nominal parameters of the first channel are inputted into a second target function, and a second loss value is calculated according to the second target function. If the second loss value is greater than a second preset loss value, a parameter of the second initial estimation model is adjusted to obtain a trained second estimation model. If the second loss value is less than or equal to the second preset loss value, the trained second estimation model is determined as the second AI estimation model.

In the above procedure, with aid of the second AI estimation model, the channel-estimation result of the first channel can be obtained directly according to the first reference signal. That is because the second AI estimation model is obtained through training with the historical first reference signals and the nominal parameters of the first channel (actual parameters of the first channel) corresponding to the historical first reference signals. The above process specifically includes the following. The multiple historical first reference signals are inputted into the second initial estimation model to obtain the predicted channel-estimation results, where the historical first reference signals may be an original reference signal transmitted repeatedly by the transmitting end, or may be a received reference signal received repeatedly by the receiving end, or may be the original reference signal transmitted repeatedly by the transmitting end as well as the received signal received by the corresponding receiving end; and for each historical first reference signal, when transmitted on the first channel, it corresponds to a nominal parameter of the first channel, for example, an actual time response or frequency response of the first channel. Then the predicted channel-estimation result and the nominal parameter of the first channel corresponding to each historical first reference signal are inputted into the second target function to calculate the second loss value. A small second loss value indicates that the predicted channel-estimation result is close to the nominal parameter of the first channel, in other words, channel estimation performance of the second initial estimation model is good; otherwise, channel estimation performance of the second initial estimation model is poor. The second initial estimation model is trained and adjusted repeatedly to obtain the trained second estimation model until the second loss value that is calculated according to the second target function is less than or equal to the second preset loss value, and then the trained second estimation model is determined as the second AI estimation model.

The second training data set for the second AI estimation model may include the historical first reference signals, and may further include other auxiliary information corresponding to the first channel when receiving the historical first reference signals. The auxiliary information may be, for example, feature information obtained through feature extraction on the first reference signal, or feature information obtained through feature extraction on a channel attribute, where the feature information regarding the channel attribute may be, for example, a specific mathematical transformation feature, an energy level feature, a delay feature, a noise feature, and the like.

The second target function may be an MMSE function, or a cross entropy loss function, or a perceptual loss function, etc. If the second preset loss value is set to be excessively low, the second AI estimation model may be overfitted; and if the second preset loss value is set to be excessively high, prediction performance of the second AI estimation model may be poor. The second preset loss value may be set according to actual requirements.

As can be seen, in implementations of the disclosure, it is firstly required to obtain the second AI estimation model through training. Since the model is obtained through training with the historical first reference signals and actual channel parameters of the first channel when transmitting the historical first reference signals, and on the other hand, the model has characteristics of strong learning capability and strong generalization capability; therefore, if channel estimation is performed with the model, it is possible to effectively improve accuracy in obtaining a channel-estimation result, and then an optimal scheduling transmission scheme can be determined based on the channel feature, thereby obtaining a maximum network performance gain.

Figure 2C:
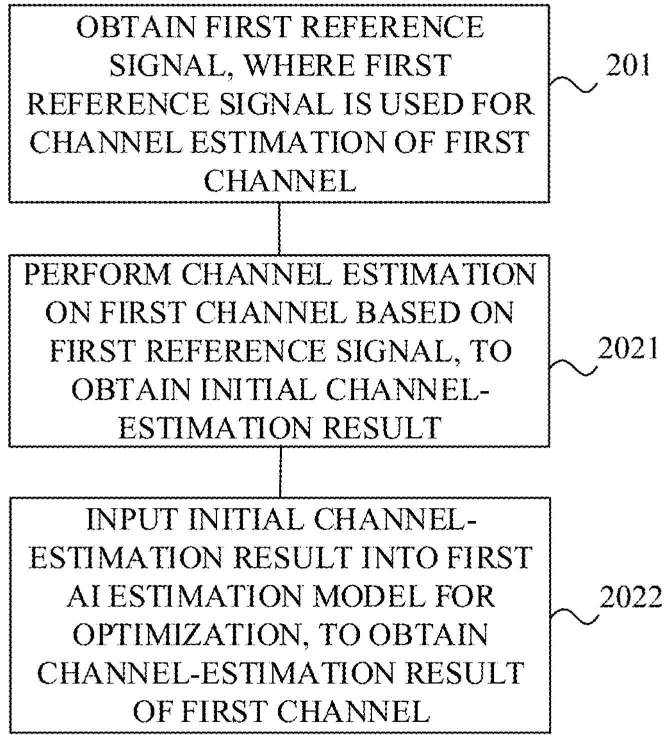
FIG. 2C is a flowchart of another AI-based channel estimation method provided in implementations of the disclosure.

Optionally, before processing the first reference signal with the AI-based estimation model, as illustrated in FIG. 2C, the method further includes the following. Step 2021, channel estimation is performed on the first channel based on the first reference signal, to obtain an initial channel-estimation result. The AI-based estimation model is a first AI estimation model, and the first reference signal is processed with the AI-based estimation model as follows. Step 2022, the initial channel-estimation result is inputted into the first AI estimation model for optimization, to obtain the channel-estimation result of the first channel.

In implementations of the disclosure, channel estimation of the first channel is performed firstly by means of a traditional channel estimation method, to obtain the initial channel-estimation result. Then the initial channel-estimation result is inputted into the first AI estimation model for optimization, to obtain the channel-estimation result of the first channel. Compared with the initial channel-estimation result, the channel-estimation result thus obtained is closer to an actual channel parameter of the first channel, i. e. the first AI estimation model is mainly intended for optimizing the initial channel-estimation result.

Optionally, the method further includes obtaining the first AI estimation model through training, which specifically includes the following. A first training data set is obtained, where the first training data set is multiple initial channel-estimation results obtained by performing multiple channel estimations on the first channel. The first training data set is inputted into a first initial estimation model for processing, to obtain predicted channel-estimation results. The predicted channel-estimation results and nominal parameters of the first channel are inputted into a first target function, and a first loss value is calculated according to the first target function. If the first loss value is greater than a first preset loss value, a parameter of the first initial estimation model is adjusted to obtain a trained first estimation model. If the first loss value is less than or equal to the first preset loss value, the trained first estimation model is determined as the first AI estimation model.

In the above procedure, with aid of the first AI estimation model, the initial channel-estimation result inputted can be optimized to obtain the channel-estimation result of the first channel. That is because the first AI estimation model is obtained through training with multiple initial channel-estimation results and corresponding nominal parameters of the first channel, where the multiple initial channel-estimation results are obtained by performing channel estimation based on multiple historical first reference signals transmitted on the first channel. The above process specifically includes the following. Channel estimation is performed based on the multiple historical first reference signals to obtain multiple corresponding initial channel-estimation results, where the channel estimation may be performed in an MMSE method. The initial channel-estimation results are inputted into the first initial estimation model to obtain predicted channel-estimation results, where each historical first reference signal corresponds to a nominal parameter of the first channel (that is, a nominal parameter corresponding to a predicted channel-estimation result corresponding to the historical first reference signal) when transmitted on the first channel. Each predicted channel-estimation result and a nominal parameter of the first channel corresponding to the predicted channel-estimation result are inputted into the first target function and calculate the first loss value. A small first loss value indicates that the predicted channel-estimation result is close to the nominal parameter of the first channel, that is, optimization performance of the first initial estimation model is good; otherwise, optimization performance of the first initial estimation model is poor. Accordingly, the first initial estimation model is trained and adjusted repeatedly to obtain the trained first estimation model until the first loss value that is calculated according to the first target function is less than or equal to the first preset loss value, and then the trained first estimation model is determined as the first AI estimation model.

As can be seen, in implementations of the disclosure, it is firstly required to obtain the first AI estimation model through training. Since the model is obtained through training with the initial channel-estimation results of the first channel and actual channel parameters of the first channel when transmitting the historical first reference signals, and on the other hand, the model has characteristics of strong learning capability and strong generalization capability, if the channel-estimation result is optimized with the model, it is possible to effectively improve accuracy in obtaining the channel-estimation result, and an optimal scheduling transmission scheme can be determined based on the channel feature, thereby obtaining a maximum network performance gain.

If a network node executing the model is the terminal, it is necessary to determine a method for the terminal to obtain the model. For example, the terminal may obtain the model through training by the terminal itself, and in this case, the terminal may need to obtain related parameters for training the model from other ends. Alternatively, the terminal may directly obtain related parameters for a trained model from other ends. The method for the terminal to obtain model-related parameters includes the following. (1) Related parameters are obtained from the network device. For example, the network device may indicate model parameter information needed by the terminal through one or more of broadcasting, system information (SystemInformation, system information block (SIB)), a radio resource control (RRC) message, RRC reconfiguration signaling, downlink control information (DCI), a media access control control-control element (MAC CE), and a physical downlink control channel (PDCCH) order. The terminal may obtain the parameter information in a manner predefined in a protocol. (2) Related parameters are obtained from other terminals. For example, the terminal obtains model-related parameter information through a sidelink.

In the above procedure, the channel-estimation result is obtained through channel estimation, or the channel-estimation result is optimized to obtain an optimized channel-estimation result. In addition, channel recovery can also be performed, i. e. after the terminal estimates a subset channel of a full channel, the full channel can be recovered based on the subset channel, to obtain a channel-recovery result, i. e. obtain a channel-estimation result of the full channel. For example, the subset channel may be channel H_RS for a reference signal in the full channel, and the full channel may be channel H corresponding to full bandwidth W and time domain T The full bandwidth includes, for example, a bandwidth such as 100 megahertz (MHz), 50 MHz, and 20 MHz, or includes a specific resource block (RB) such as K RBs, where K is a positive integer.

Optionally, the method further includes the following. The channel-estimation result of the first channel is processed with an AI-based recovery model, to obtain a channel-recovery result, where the channel-recovery result indicates a channel-estimation result of a full channel, and the first channel is a subset of the full channel.

In implementations of the disclosure, the AI-based recovery model is a channel recovery model obtained through AI training. The channel-recovery result can be obtained by inputting data into the model. Channel recovery may be performed at the transmitting end or the receiving end. For example, channel recovery and channel estimation are performed at the same end; or channel recovery and channel estimation may be performed at different ends, for example, channel estimation is performed at the transmitting end, and channel recovery is performed at the receiving end. The channel-estimation result of the first channel is processed with the AI-based recovery model, where the estimation result of the first channel may be obtained directly through estimation with the second AI estimation model as described above, or may be obtained through optimization with the first AI estimation model. In terms of obtaining the channel-recovery result with the AI-based recovery model, the channel-recovery result may be obtained through channel recovery performed directly according to the estimation result of the first channel, or the channel-recovery result may be obtained by obtaining an initial channel-recovery result through channel recovery by means of a traditional method and then optimizing the initial channel-recovery result.

Figure 2D:
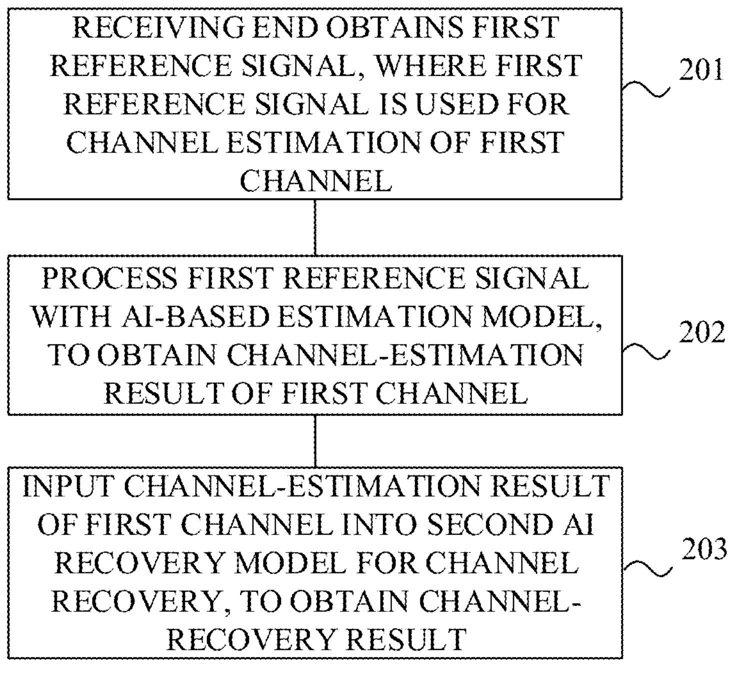
FIG. 2D is a flowchart of a channel estimation and recovery method provided in implementations of the disclosure.

Based on the above illustration, referring to FIG. 2D, FIG. 2D is a flowchart of a channel estimation and recovery method provided in implementations of the disclosure. As illustrated in FIG. 2D, based on steps 201 and 202 above, the method further includes the following operation, where the channel-estimation result of the first channel is inputted into a second AI recovery model for channel recovery, to obtain the channel-recovery result.

Figure 2E:
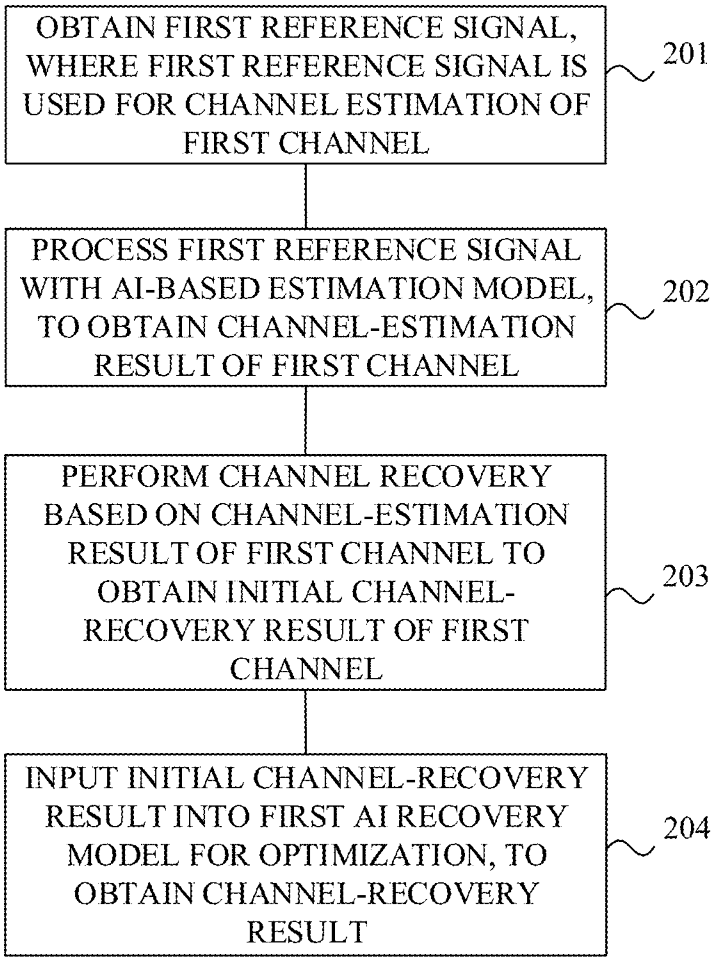
FIG. 2E is a flowchart of another channel estimation and recovery method provided in implementations of the disclosure.

Alternatively, referring to FIG. 2E, FIG. 2E is a flowchart of another channel estimation and recovery method provided in implementations of the disclosure. As illustrated in FIG. 2E, based on steps 201 and 202 above, the method further includes the following.

203, channel recovery is performed based on the channel-estimation result of the first channel to obtain an initial channel-recovery result of the first channel.

204, the initial channel-recovery result is inputted into a first AI recovery model for optimization, to obtain the channel-recovery result.

In implementations of the disclosure, the channel-estimation result of the first channel is processed with the AI-based recovery model to obtain the channel-estimation result of the full channel. Since the model has characteristics of strong learning capability and strong generalization capability, if channel recovery is performed with the model, it is possible to effectively improves channel recovery performance, and then an optimal scheduling transmission scheme can be determined based on channel feature, thereby obtaining a maximum network performance gain.

In the above procedure, in order to obtain the AI-based recovery model (including the first AI recovery model or the second AI recovery model), it is also necessary to perform model training. With regard to the first AI recovery model, the training data inputted is multiple initial channel-recovery results obtained through channel recovery performed based on the channel-estimation result of the first channel, and the data outputted is optimized predicted channel-recovery results. With regard to the second AI recovery model, the training data inputted is multiple channel-estimation results of the first channel, and the data outputted is predicted channel-recovery results. Then a loss value is calculated based on the predicted channel-recovery results and nominal parameters of the full channel that the first channel belongs to, to determine how well the model predicts, and if the model predicts well enough (i.e. reaches a preset effect), determine that a trained AI-based recovery model is obtained.

Likewise, if a network node executing the model is the terminal, the terminal may obtain related parameters required for training the model from other ends and then obtain the model through training by the terminal itself, or may directly obtain related parameters of a trained model from other ends. A method for obtaining related parameters by the terminal includes the following. (1) Related parameters are obtained from the network device. (2) Related parameters are obtained from other terminals. For specific examples thereof, reference can be made to the above illustration, which will not be repeated herein.

As can be seen, in implementations of the disclosure, after obtaining the channel-estimation result of the first channel with the AI-based estimation model, recovery is performed according to the obtained channel-estimation result of the first channel with the AI-based recovery model to obtain the channel-recovery result; or channel recovery is performed according to the obtained channel-estimation result of the first channel by means of a traditional method to obtain an initial channel-recovery result and then the initial channel-recovery result is optimized with the AI-based recovery model to obtain the channel-recovery result. As such, it is possible to improve accuracy of channel estimation by using a model to obtain the channel-estimation result of the first channel, and then improve accuracy of channel recovery by using a model to obtain the channel-recovery result, thereby overall improving accuracy of obtained channel parameters of a full channel, and on the other hand, an optimal scheduling transmission scheme can be subsequently determined based on the channel feature, thereby obtaining a maximum network performance gain.

Figures 3A, 3B:
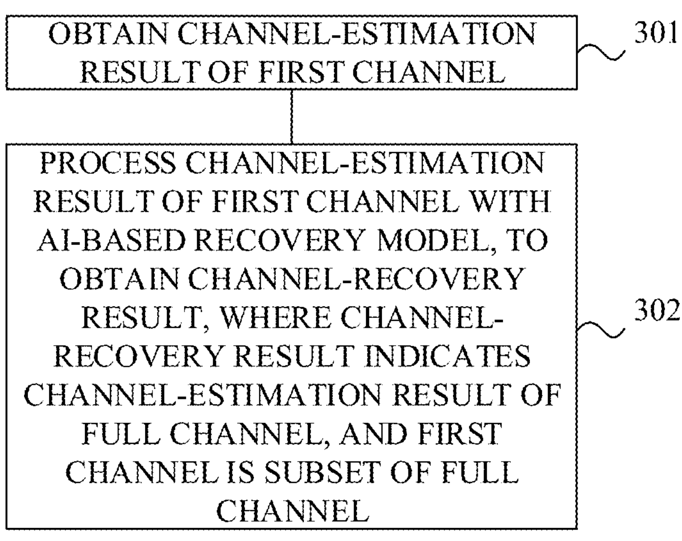
FIG. 3A is a flowchart of an AI-based channel recovery method provided in implementations of the disclosure.
FIG. 3B is a flowchart of another AI-based channel recovery method provided in implementations of the disclosure.

Referring to FIG. 3A, FIG. 3A is a flowchart of an AI-based channel recovery method provided in implementations of the disclosure. As illustrated in FIG. 3A, the method includes the following.

301, a channel-estimation result of a first channel is obtained.

302, the channel-estimation result of the first channel is processed with an AI-based recovery model, to obtain a channel-recovery result, where the channel-recovery result indicates a channel-estimation result of a full channel, and the first channel is a subset of the full channel.

The full channel may be channel H corresponding to full bandwidth W and time domain T The first channel may be channel H_RS for a reference signal in the full channel. The first channel may be a single channel or multiple channels.

In implementations of the disclosure, channel recovery may be performed at a transmitting end or a receiving end. For example, channel recovery and channel estimation are performed at the same end; or channel recovery and channel estimation may be performed at different ends, for example, channel estimation is performed at the transmitting end, and channel recovery is performed at the receiving end. After channel recovery is completed, a scheduling transmission scheme can be determined based on channel-estimation results of the full channel, to obtain a maximum network performance gain. The signal receiving end may be a terminal or a network device, and the signal transmitting end may be a network device or a terminal. That is, this disclosure may relate to a communication between a network device and a terminal, or may be communication between network devices, or may be communication between terminals.

Exemplarily, communication is between a network device and a terminal, and channel recovery is performed by a terminal. Firstly, the terminal obtains the channel-estimation result of the first channel, where the channel-estimation result may be obtained by means of a traditional channel estimation method such as an MMSE method, or may be obtained with an AI model. In some cases, what is obtained may also be an actual channel parameter of the first channel, which may specifically be a time response or frequency response of the first channel. Then the channel-estimation result of the first channel is processed to obtain the channel-recovery result, that is, a channel-estimation result of the full channel.

Optionally, as illustrated in FIG. 3B, before processing the channel-estimation result of the first channel with the AI-based recovery model, the method further includes the following. Step 3021, channel recovery is performed based on the channel-estimation result of the first channel to obtain an initial channel-recovery result. The AI-based recovery model is a first AI recovery model, and the channel-estimation result of the first channel is processed with the AI-based recovery model specifically as follows. Step 3022, the initial channel-recovery result is inputted into the first AI recovery model for optimization, to obtain the channel-recovery result.

In implementations of the disclosure, channel recovery is performed based on the estimation result of the first channel firstly by means of a traditional channel recovery method such as interpolation, to obtain an initial channel-recovery result of the full channel. Then the initial channel-recovery result is inputted into the first AI recovery model for optimization, to obtain the channel-recovery result. Compared with the initial channel-recovery result, the channel-recovery result thus obtained is closer to an actual channel parameter of the full channel, i. e. the first AI recovery model is mainly intended for optimizing the initial channel-recovery result.

Optionally, the method further includes obtaining the first AI recovery model through training, which specifically includes the following. A third training data set is obtained, where the third training data set is multiple initial channel-recovery results obtained by performing channel recovery according to the channel-estimation result of the first channel. The third training data set is inputted into a first initial recovery model for processing, to obtain predicted channel-recovery results. The predicted channel-recovery results and nominal parameters of the full channel are inputted into a third target function, and a third loss value is calculated according to the third target function. If the third loss value is greater than a third preset loss value, a parameter of the first initial recovery model is adjusted to obtain a trained first recovery model. If the third loss value is less than or equal to the third preset loss value, the trained first recovery model is determined as the first AI recovery model.

In the above procedure, with aid of the first AI recovery model, the initial channel-recovery results inputted can be optimized to obtain the channel-recovery result. That is because the first AI recovery model is obtained through training with multiple initial channel-recovery results and corresponding nominal parameters of the full channel, where the multiple initial channel-recovery results are obtained by performing channel recovery according to multiple channel-estimation results of the first channel. The process specifically includes the following. The receiving end obtains multiple channel-estimation results of the first channel, where each channel-estimation result may be obtained by means of a traditional channel estimation method based on a historical first reference signal received on the first channel, or may be obtained through processing with a model. The receiving end performs channel recovery based on the multiple channel-estimation results of the first channel to obtain initial channel-recovery results, and then inputs the initial channel-recovery results into the first initial recovery model to obtain predicted channel-recovery results. For each historical first reference signal, when transmitted, the full channel that the first channel corresponding to the historical first reference signal belongs to has a corresponding nominal parameter, i. e. a nominal parameter of the full channel corresponding to an initial channel-recovery result corresponding to the historical first reference signal. The receiving end inputs each predicted channel-recovery result and a nominal parameter of the full channel corresponding to the predicted channel-recovery result into the third target function to calculate the third loss value. A small third loss value indicates that the predicted channel-recovery result is close to the nominal parameter of the full channel, that is, optimization performance of the first initial recovery model is good; otherwise, optimization performance of the first initial recovery model is poor. Accordingly, the receiving end trains the first initial recovery model repeatedly and adjusts the first initial recovery model repeatedly to obtain the trained first recovery model until the third loss value that is calculated according to the third target function is less than or equal to the third preset loss value, and then determines the trained first recovery model as the first AI recovery model.

As can be seen, in implementations of the disclosure, the initial channel-recovery result of the full channel is processed with the first AI recovery model, to obtain the channel-recovery result. Since the model has characteristics of strong learning capability and strong generalization capability, if optimization of channel recovery is performed with the model, it is possible to effectively improve channel recovery performance, and then an optimal scheduling transmission scheme can be determined based on the channel feature, thereby obtaining a maximum network performance gain.

Figure 3C:
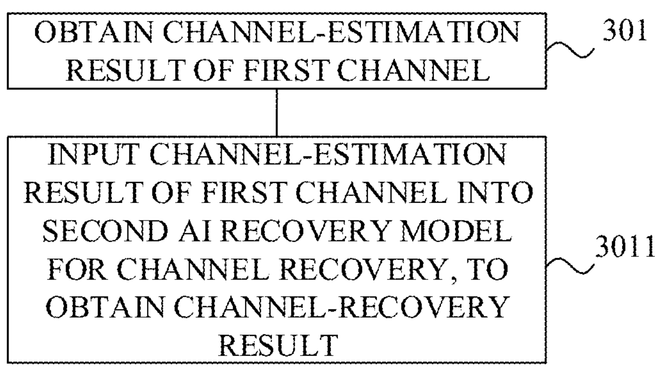
FIG. 3C is a flowchart of another AI-based channel recovery method provided in implementations of the disclosure.

Optionally, the AI recovery model is a second AI recovery model. As illustrated in FIG. 3C, the channel-estimation result of the first channel is processed with the AI-based recovery model specifically as follows. Step 3011, the channel-estimation result of the first channel is inputted into the second AI recovery model for channel recovery, to obtain the channel-recovery result.

In implementations of the disclosure, channel recovery is performed according to the channel-estimation result of the first channel with the second AI recovery model, to obtain the channel-recovery result. That is, input data of the model is the channel-estimation result of the first channel, and output data is directly the channel-recovery result. Likewise, the channel-estimation result of the first channel may be obtained directly from the network device or another terminal, or may be obtained through channel estimation performed by the current receiving end. The channel estimation method may be a traditional method or an AI model-based estimation method. In some cases, the obtained estimation result of the first channel may be an actual channel parameter of the first channel, and accordingly, when obtaining the channel-recovery result with the second AI recovery model, the input data is an actual channel parameter of the first channel corresponding to a current signal transmission.

Optionally, the method further includes obtaining the second AI recovery model through training, which specifically includes the following. A fourth training data set is obtained, where the fourth training data set is multiple channel-estimation results of the first channel. The fourth training data set is inputted into a second initial recovery model for processing, to obtain predicted channel-recovery results. The predicted channel-recovery results and nominal parameters of the full channel are inputted into a fourth target function, and a fourth loss value is calculated according to the fourth target function. If the fourth loss value is greater than a fourth preset loss value, a parameter of the second initial recovery model is adjusted to obtain a trained second recovery model. If the fourth loss value is less than or equal to the fourth preset loss value, the trained second recovery model is determined as the second AI recovery model.

In the above procedure, with aid of the second AI recovery model, the channel-recovery result can be obtained directly according to the channel-estimation result of the first channel. That is because the second AI recovery model is obtained through training with historical channel-estimation results of the first channel and corresponding nominal parameters of the full channel (actual channel parameters of the full channel). The process specifically includes the following. Multiple channel-estimation results of the first channel are inputted into the second initial recovery model to obtain predicted channel-recovery results. Each channel-estimation result of the first channel is a channel-estimation result when a first reference signal is transmitted; and when transmitting the first reference signal on the first channel, the full channel corresponding to the first reference signal has a corresponding nominal parameter. Accordingly, each predicted channel-recovery result and a nominal parameter of the full channel corresponding to the predicted channel-recovery result are inputted into the fourth target function, to calculate the fourth loss value. A small fourth loss value indicates that the predicted channel-recovery result is close to the nominal parameter of the full channel, that is, channel recovery performance of the second initial recovery model is good; otherwise, channel recovery performance of the second initial recovery model is poor. The second initial recovery model is trained and adjusted repeatedly to obtain the trained second recovery model until the fourth loss value that is calculated according to the fourth target function is less than or equal to the fourth preset loss value, and then the trained second recovery model is determined as the second AI recovery model.

As can be seen, in implementations of the disclosure, the channel-estimation result of the first channel is processed with the second AI recovery model, to obtain the channel-recovery result. Since the model has characteristics of strong learning capability and strong generalization capability, if channel recovery is performed with the model, it is possible to effectively improve channel recovery performance, and then an optimal scheduling transmission scheme can be determined based on the channel feature, thereby obtaining a maximum network performance gain.

Figure 4:
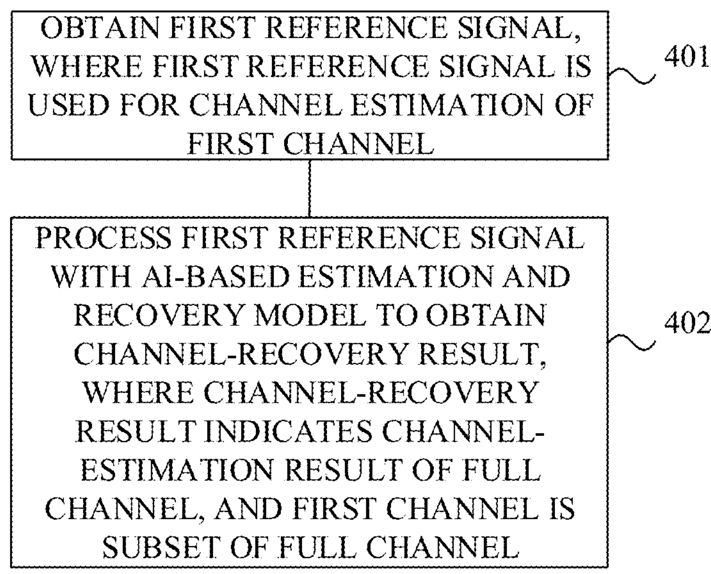
FIG. 4 is a flowchart of an AI-based channel estimation and recovery method provided in implementations of the disclosure.

Referring to FIG. 4, FIG. 4 is a flowchart of an AI-based channel estimation and recovery method provided in implementations of the disclosure. As illustrated in FIG. 4, the method includes the following.

401, a first reference signal is obtained, where the first reference signal is used for estimation of a first channel.

402, the first reference signal is processed with an AI-based estimation and recovery model to obtain a channel-recovery result, where the channel-recovery result indicates a channel-estimation result of a full channel, and the first channel is a subset of the full channel.

As can be seen from illustrations of the method implementations corresponding to FIG. 2A to FIG. 2E, the first reference signal may be an original reference signal transmitted at a transmitting end, or may be a received reference signal received at a receiving end, or may be the original reference signal and the received reference signal. The transmitting end may be a network device or a terminal, and the receiving end may be a terminal or a network device. Channel estimation and recovery may be performed at the transmitting end, or may be performed at the receiving end.

The AI-based estimation and recovery model is a channel estimation and recovery model obtained through AI training. The channel-recovery result can be obtained by inputting a reference signal into the model. Exemplarily, the transmitting end is a network device and the receiving end is a terminal, and channel estimation and recovery is performed by a terminal. After obtaining the first reference signal, the terminal performs channel estimation and recovery based on the first reference signal with the AI-based estimation and recovery model, thereby obtaining the channel-recovery result. In a traditional method, channel estimation is firstly performed to obtain the channel-estimation result of the first channel on which the first reference signal is transmitted. The channel estimation method used in this procedure may be, for example, an MMSE method. The channel-estimation result of the first channel is determined according to an association between first reference signal S_r received at the receiving end and an actual reference signal S_t transmitted at the transmitting end. If the first reference signal and the actual reference signal are in a non-linear relationship, the channel-estimation result will be low in accuracy. Then channel recovery is performed according to the channel-estimation result of the first channel, to obtain the channel-recovery result. In a traditional method adopted in this recovery procedure, based on an estimated condition of a channel where there is a reference signal, an estimation value is obtained for a channel where there is no reference signal through interpolation, thereby completing channel recovery of the full channel. If such method is adopted, the channel-recovery result will be low in accuracy. In addition, channel estimation and channel recovery are performed separately, and as a result, uncertainty in intermediate steps will be increased and thus accuracy of the result will be reduced.

Therefore, in implementations of the disclosure, with an AI model, channel estimation and recovery is performed directly according to the received first reference signal, and as such, multiple intermediate steps can be integrated into one step, thereby improving efficiency in channel estimation and recovery. In addition, the AI model has a stronger generalization capability and is well-fitted for a nonlinear channel. If channel estimation is performed with the model, a more accurate channel-estimation result can be obtained, and if signal scheduling is subsequently performed based on the channel-estimation result, network performance can be greatly improved.

Optionally, the method further includes obtaining the AI-based estimation and recovery model through training, which specifically includes the following. A fifth training data set is obtained, where the fifth training data set is multiple historical first reference signals. The fifth training data set is inputted into an initial estimation and recovery model for processing, to obtain predicted channel-recovery results. The predicted channel-recovery results and nominal parameters of the full channel are inputted into a fifth target function, and a fifth loss value is calculated according to the fifth target function. If the fifth loss value is greater than a fifth preset loss value, a parameter of the initial estimation and recovery model is adjusted to obtain a trained estimation and recovery model. If the fifth loss value is less than or equal to the fifth preset loss value, the trained estimation and recovery model is determined as the AI-based estimation and recovery model.

In the above procedure, with aid of the AI-based estimation and recovery model, channel estimation and recovery can be performed according to the input first reference signal to obtain the channel-recovery result. That is because the AI-based estimation and recovery model is obtained through training with multiple historical first reference signals and corresponding nominal parameters of the full channel (actual channel parameters of the full channel) that the first channel belongs to when transmitting the first reference signals on the first channel. The process specifically includes the following. Multiple historical first reference signals transmitted on the first channel are inputted into the initial estimation and recovery model to obtain corresponding predicted channel-recovery results, where the historical first reference signals are first reference signals transmitted before a first reference signal which is used for current channel estimation and recovery; and when transmitting the first reference signal used for the current channel estimation and recovery on the first channel, the full channel that the first channel belongs to has a corresponding nominal parameter, i. e. a nominal parameter of the full channel corresponding to the first reference signal used for the current channel estimation and recovery. For each historical first reference signal, a predicted channel-recovery result and a nominal parameter of the full channel corresponding to the historical first reference signal are inputted into the fifth target function to calculate the fifth loss value. A small fifth loss value indicates that the predicted channel-recovery result is close to the nominal parameter of the full channel, that is, estimation and recovery performance of the initial estimation and recovery model is good; otherwise, estimation and recovery performance of the initial estimation and recovery model is poor. Accordingly, the initial estimation and recovery model is trained and adjusted repeatedly to obtain the trained estimation and recovery model until the fifth loss value that is calculated according to the fifth target function is less than or equal to the fifth preset loss value, and then the trained estimation and recovery model is determined as the AI-based estimation and recovery model.

For selection of the fifth target function and setting of the fifth preset loss value, reference can be made to elaborations of the implementations corresponding to FIG. 2A to FIG. 2E, which will not be elaborated again herein.

An AI-based channel estimation and recovery method is further provided in implementations of the disclosure. The method includes the following. A first reference signal is obtained, where the first reference signal is used for estimation of a first channel. The first reference signal is processed with an AI-based estimation and recovery model to obtain a channel-recovery result, where the channel-recovery result indicates a channel-estimation result of a full channel, and the first channel is a subset of the full channel.

In implementations of the disclosure, with aid of the AI-based estimation and recovery model, channel estimation and recovery is performed directly according to the received first reference signal, and as such, multiple intermediate steps can be integrated into one step, thereby improving efficiency in channel estimation and recovery. In addition, the AI model has a stronger generalization capability and is well-fitted for a nonlinear channel. If channel estimation is performed with the model, a more accurate channel-estimation result can be obtained, and if signal scheduling is subsequently performed based on the channel-estimation result, network performance can be greatly improved.

Figure 5A:
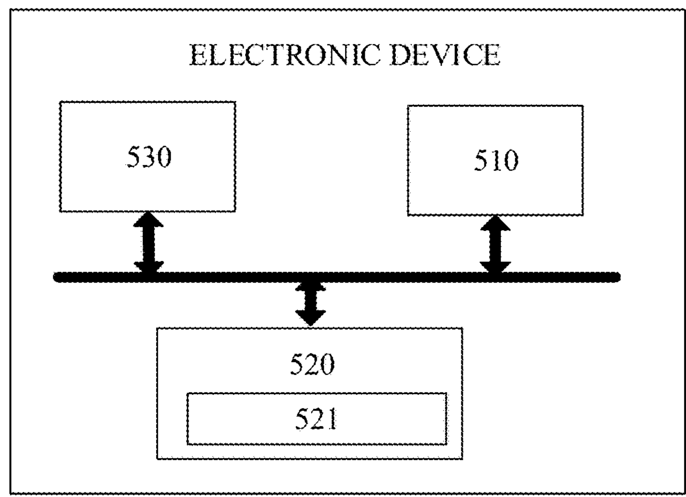
FIG. 5A is a schematic structural diagram of an electronic device provided in implementations of the disclosure.

Consistent with the above implementations, referring to FIG. 5A, FIG. 5A is a schematic structural diagram of an electronic device provided in implementations of the disclosure, As illustrated in FIG. 5A, the electronic device includes a processor 510, a memory 520, a transceiver 530, and one or more programs 521. The one or more programs 521 are stored in the memory 520 and configured to be executed by the processor 510. The programs include instructions for: obtaining a first reference signal, where the first reference signal is used for channel estimation of a first channel; and processing the first reference signal with an AI-based estimation model, to obtain a channel-estimation result of the first channel.

As can be seen, in implementations of the disclosure, the first reference signal is processed with the AI-based estimation model to obtain the channel-estimation result of the first reference signal, i. e. channel estimation is performed by processing a reference signal with an AI model. Since the model has characteristics of strong learning capability and strong generalization capability, if channel estimation is performed with the model, it is possible to effectively improve channel estimation performance, and then an optimal scheduling transmission scheme can be determined based on the channel feature, thereby obtaining a maximum network performance gain.

In a possible example, before processing the first reference signal with the AI-based estimation model, the programs include instructions for performing channel estimation on the first channel based on the first reference signal, to obtain an initial channel-estimation result. The AI-based estimation model is a first AI estimation model, and the first reference signal is processed with the AI-based estimation model as follows. The initial channel-estimation result is inputted into the first AI estimation model for optimization, to obtain the channel-estimation result of the first channel.

Figure 5B:
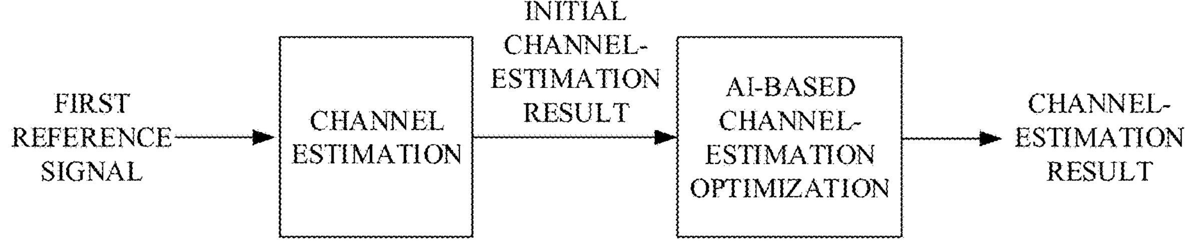
FIG. 5B is a schematic diagram illustrating an AI-based channel estimation procedure provided in implementations of the disclosure.

For the specific process thereof, reference can be made to FIG. 5B. As illustrated in FIG. 5B, the process specifically includes: inputting the first reference signal, and then performing channel estimation to obtain the initial channel-estimation result; and inputting the initial channel-estimation result into the first AI estimation model for AI-based channel-estimation optimization, to obtain the channel-estimation result.

In a possible example, the AI-based estimation model is a second AI estimation model, and the first reference signal is processed with the AI-based estimation model as follows. The first reference signal is inputted into the second AI estimation model for channel estimation, to obtain the channel-estimation result of the first channel.

Figure 5C:
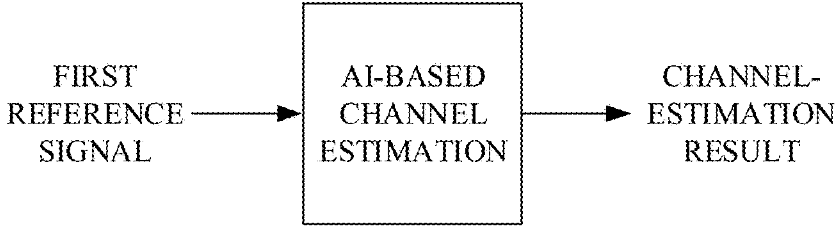
FIG. 5C is a schematic diagram illustrating another AI-based channel estimation procedure provided in implementations of the disclosure.

For the specific process thereof, reference can be made to FIG. 5C. As illustrated in FIG. 5C, the process specifically includes: inputting the first reference signal into the second AI estimation model for AI-based channel estimation, to obtain the channel-estimation result.

In a possible example, the programs include instructions for: obtaining a first training data set, where the first training data set is multiple initial channel-estimation results obtained by performing channel estimation multiple times on the first channel; input the first training data set into a first initial estimation model for processing, to obtain predicted channel-estimation results; inputting the predicted channel-estimation results and nominal parameters of the first channel into a first target function, and calculating a first loss value according to the first target function; if the first loss value is greater than a first preset loss value, adjusting a parameter of the first initial estimation model to obtain a trained first estimation model; and if the first loss value is less than or equal to the first preset loss value, determining the trained first estimation model as the first AI estimation model.

In a possible example, the programs include instructions for: obtaining a second training data set, where the second training data set is multiple historical first reference signals; inputting the second training data set into a second initial estimation model for processing, to obtain predicted channel-estimation results; inputting the predicted channel-estimation results and nominal parameters of the first channel into a second target function, and calculating a second loss value according to the second target function; if the second loss value is greater than a second preset loss value, adjusting a parameter of the second initial estimation model to obtain a trained second estimation model; and if the second loss value is less than or equal to the second preset loss value, determining the trained second estimation model as the second AI estimation model.

In a possible example, the programs further include instructions for: processing the channel-estimation result of the first channel with an AI-based recovery model, to obtain a channel-recovery result, where the channel-recovery result indicates a channel-estimation result of a full channel, and the first channel is a subset of the full channel.

In a possible example, before processing the channel-estimation result of the first channel with the AI-based recovery model, the programs further include instructions for: performing channel recovery based on the channel-estimation result of the first channel to obtain an initial channel-recovery result of the first channel. The AI-based recovery model is a first AI recovery model, and the channel-estimation result of the first channel is processed with the AI-based recovery model as follows. The initial channel-recovery result is inputted into the first AI recovery model for optimization, to obtain the channel-recovery result.

Figure 5D:
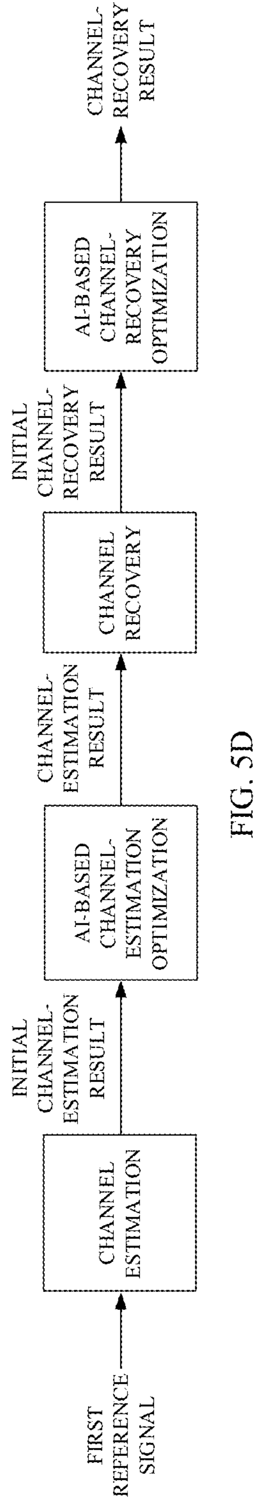
FIG. 5D is a schematic diagram illustrating an AI-based channel estimation and recovery procedure provided in implementations of the disclosure.

In implementations of the disclosure, traditional channel recovery is firstly performed according to the channel-estimation result of the first channel, and then channel recovery is performed with the first AI recovery model to obtain the channel-recovery result. The input channel-estimation result of the first channel may be obtained by processing with the AI-based estimation model, which may specifically be a channel-estimation result obtained by optimizing a traditional channel-estimation result or the initial channel-estimation result with the first AI estimation model. Referring to FIG. 5D, as illustrated in FIG. 5D, the process includes: inputting the first reference signal, and performing channel estimation by means of a traditional method to obtain the initial channel-estimation result; then inputting the initial channel-estimation result into the first AI estimation model for AI-based channel-estimation optimization, to obtain the channel-estimation result; then performing traditional channel recovery according to the channel-estimation result to obtain the initial channel-recovery result; and inputting the obtained initial channel-recovery result into the first AI recovery model for AI-based channel-recovery optimization, to obtain a final channel-recovery result.

Figure 5E:
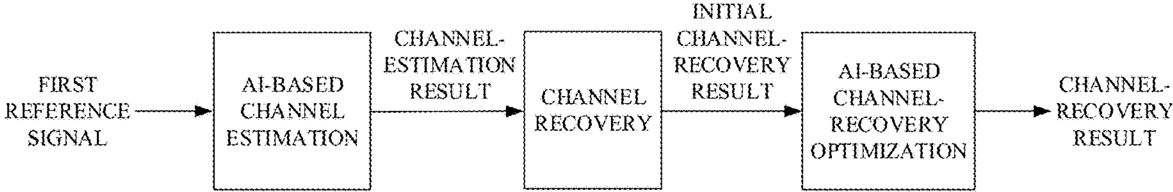
FIG. 5E is a schematic diagram illustrating an AI-based channel estimation and recovery procedure provided in implementations of the disclosure.

Alternatively, AI-based channel estimation may also be performed with the second AI estimation model to obtain the estimation result of the first channel. Specifically, referring to FIG. 5E, as illustrated in FIG. 5E, the process includes: inputting the first reference signal, and performing AI-based channel estimation based on the first reference signal with the second AI estimation model to obtain the channel-estimation result of the first channel; then performing traditional channel recovery according to the channel-estimation result of the first channel to obtain the initial channel-recovery result; and inputting the initial channel-recovery result into the first AI recovery model for AI-based channel-recovery optimization, to obtain a final channel-recovery result.

In a possible example, the AI-based recovery model is a second AI recovery model, and the channel-estimation result of the first channel is processed with the AI-based recovery model as follows. The channel-estimation result of the first channel is inputted into the second AI recovery model for channel recovery, to obtain the channel-recovery result.

Figure 5F:
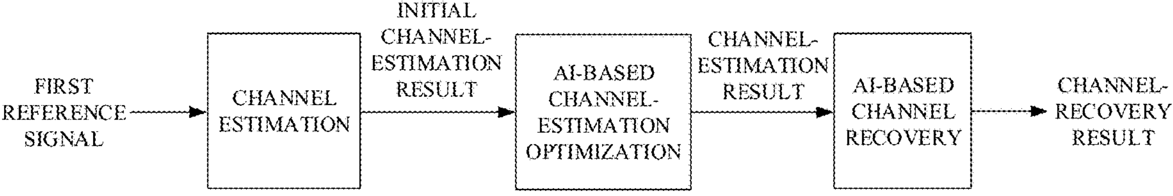
FIG. 5F is a schematic diagram illustrating an AI-based channel estimation and recovery procedure provided in implementations of the disclosure.

In implementations of the disclosure, channel recovery is performed based on channel estimation of the first channel with the second AI recovery model to obtain the channel-recovery result. Likewise, the input channel-estimation result of the first channel may be obtained through processing with the AI-based estimation model. Specifically, the channel-estimation result may be obtained by optimizing, with the first AI estimation model, the initial channel-estimation result obtained through traditional channel estimation. Referring to FIG. 5F. as illustrated in FIG. 5F, the process includes: inputting the first reference signal and performing channel estimation by means of a traditional method to obtain the initial channel-estimation result; then inputting the initial channel-estimation result into the first AI estimation model for AI-based channel-estimation optimization, to obtain the channel-estimation result; and inputting the channel-estimation result into the second AI recovery model for AI-based channel recovery, to obtain a final channel-recovery result.

Figure 5G:
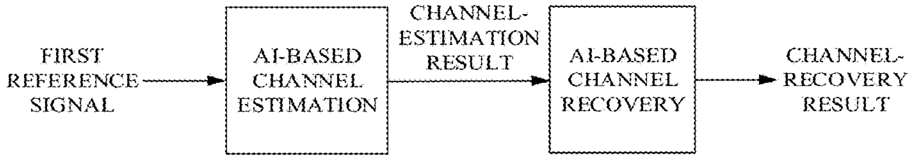
FIG. 5G is a schematic diagram illustrating an AI-based channel estimation and recovery procedure provided in implementations of the disclosure.

Alternatively, AI-based channel estimation may also be performed with the second AI estimation model to obtain the estimation result of the first channel. Specifically, referring to FIG. 5G, as illustrated in FIG. 5G, the process includes: inputting the first reference signal and performing AI-based channel estimation based on the first reference signal with the second AI estimation model to obtain the channel-estimation result of the first channel; and then inputting the channel-estimation result into the second AI recovery model for AI-based channel recovery, to obtain a final channel-recovery result.

For detailed illustration of executing the foregoing steps by the programs, reference can be made to related illustrations in the method implementations illustrated in FIG. 2A to FIG. 2E, which will not be described in detail again herein.

Alternatively, the programs 521 include instructions for performing: obtaining a channel-estimation result of a first channel; and processing the channel-estimation result of the first channel with an AI-based recovery model, to obtain a channel-recovery result, where the channel-recovery result indicates a channel-estimation result of a full channel, and the first channel is a subset of the full channel.

In implementations of the disclosure, the channel-estimation result of the first channel is processed with the AI-based recovery model, to obtain the channel-estimation result of the full channel. Since the model has characteristics of strong learning capability and strong generalization capability, if channel recovery is performed with the model, it is possible to effectively improve channel recovery performance, and then an optimal scheduling transmission scheme can be determined based on the channel feature, thereby obtaining a maximum network performance gain.

In a possible example, before processing the channel-estimation result of the first channel with the AI-based recovery model, the programs 521 include instructions for: performing channel recovery based on the channel-estimation result of the first channel to obtain an initial channel-recovery result. The AI-based recovery model is a first AI recovery model, and the channel-estimation result of the first channel is processed with the AI-based recovery model as follows. The initial channel-recovery result is inputted into the first AI recovery model for optimization, to obtain the channel-recovery result.

In implementations of the disclosure, traditional channel recovery is firstly performed according to the channel-estimation result of the first channel, and then channel recovery is performed with the first AI recovery model to obtain the channel-recovery result. The input channel-estimation result of the first channel may be obtained by means of a traditional method, or may be obtained through processing with the AI-based estimation model. The process of obtaining the channel-estimation result of the first channel through processing with the AI-based estimation model has been illustrated in corresponding illustrations in FIG. 5D and FIG. 5E, which will not be repeated herein.

Figure 5H:
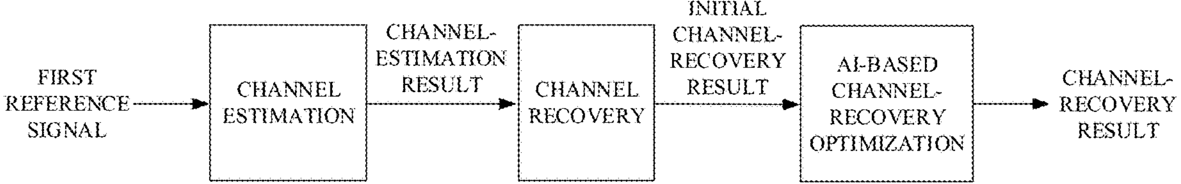
FIG. 5H is a schematic diagram illustrating an AI-based channel recovery procedure provided in implementations of the disclosure.

If the channel-estimation result of the first channel is obtained by means of a traditional method, referring to FIG. 5H, as illustrated in FIG. 5H, the process includes: inputting the first reference signal, and performing channel estimation by means of a traditional method to obtain the channel-estimation result; then performing traditional channel recovery based on the channel-estimation result to obtain the initial channel-recovery result; and inputting the obtained initial channel-recovery result into the first AI recovery model for AI-based channel-recovery optimization, to obtain a final channel-recovery result.

In a possible example, the AI-based recovery model is a second AI recovery model, and the channel-estimation result of the first channel is processed with the AI-based recovery model as follows. The channel-estimation result of the first channel is inputted into the second AI recovery model for channel recovery, to obtain the channel-recovery result.

Figure 5I:
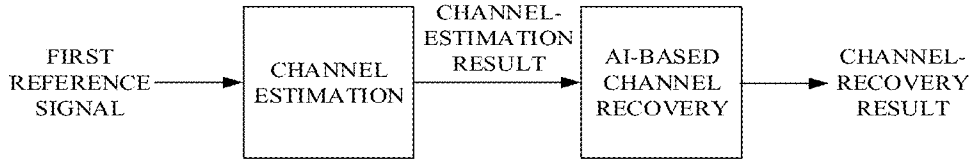
FIG. 5I is a schematic diagram illustrating an AI-based channel recovery procedure provided in implementations of the disclosure.

In implementations of the disclosure, channel recovery is performed based on channel estimation of the first channel with the second AI recovery model to obtain the channel-recovery result. Likewise, in this implementation, the case where the channel-estimation result of the first channel is obtained by means of a traditional method will be described. As illustrated in FIG. 5I, the process includes: inputting the first reference signal, and performing channel estimation by means of a traditional method to obtain the channel-estimation result of the first channel; and then inputting the channel-estimation result into the second AI recovery model for AI-based channel recovery, to obtain a final channel-recovery result.

In a possible example, the programs 521 further include instructions for: obtaining a third training data set, where the third training data set is multiple initial channel-recovery results obtained by performing channel recovery according to the channel-estimation result of the first channel; inputting the third training data set into a first initial recovery model for processing, to obtain predicted channel-recovery results; inputting the predicted channel-recovery results and nominal parameters of the full channel into a third target function, and calculating a third loss value according to the third target function; if the third loss value is greater than a third preset loss value, adjusting a parameter of the first initial recovery model to obtain a trained first recovery model; and if the third loss value is less than or equal to the third preset loss value, determining the trained first recovery model as the first AI recovery model.

In a possible example, the programs 521 further include instructions for: obtaining a fourth training data set, where the fourth training data set is multiple channel-estimation results of the first channel; inputting the fourth training data set into a second initial recovery model for processing, to obtain predicted channel-recovery results; inputting the predicted channel-recovery results and nominal parameters of the full channel into a fourth target function, and calculating a fourth loss value according to the fourth target function; if the fourth loss value is greater than a fourth preset loss value, adjusting a parameter of the second initial recovery model to obtain a trained second recovery model; and if the fourth loss value is less than or equal to the fourth preset loss value, determining the trained second recovery model as the second AI recovery model.

For detailed illustration of the foregoing steps performed by the programs, reference can be made to related illustrations in the method implementations illustrated in FIG. 3A-FIG. 3C, which not be described in detail again herein.

Alternatively, the programs 521 include instructions for: obtaining a first reference signal, where the first reference signal is used for performing estimation of a first channel; and processing the first reference signal with an AI-based estimation and recovery model to obtain a channel-recovery result, where the channel-recovery result indicates a channel-estimation result of a full channel, and the first channel is a subset of the full channel.

Figure 5J:
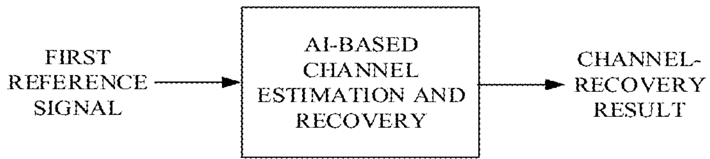
FIG. 5J is a schematic diagram illustrating an AI-based channel estimation and recovery procedure provided in implementations of the disclosure.

In implementations of the disclosure, referring to FIG. 5J, as illustrated in FIG. 5J, the channel-recovery result can be obtained by inputting the first reference signal into the AI-based estimation and recovery model for AI-based channel estimation and recovery, that is, channel estimation and channel recovery are completed with the same AI model.

As can be seen, in implementations of the disclosure, with aid of the AI-based estimation and recovery model, channel estimation and recovery is performed directly according to the first reference signal received, so that multiple intermediate steps can be integrated into one step, thereby improving efficiency in channel estimation and recovery. In addition, an AI model has strong generalization capability and is well-fitted for a nonlinear channel. If channel estimation is performed with the model, it is possible to obtain a more accurate channel-estimation result, and if signal scheduling is subsequently performed based on the channel-estimation result, network performance can be greatly improved.

In a possible example, the programs 521 further include instructions for: obtaining a fifth training data set, where the fifth training data set is multiple historical first reference signals; inputting the fifth training data set into an initial estimation and recovery model for processing, to obtain predicted channel-recovery results; inputting the predicted channel-recovery results and nominal parameters of the full channel into a fifth target function, and calculating a fifth loss value according to the fifth target function; if the fifth loss value is greater than a fifth preset loss value, adjusting a parameter of the initial estimation and recovery model to obtain a trained estimation and recovery model; and if the fifth loss value is less than or equal to the fifth preset loss value, determining the trained estimation and recovery model as the AI-based estimation and recovery model.

The solutions of implementations of the disclosure are introduced mainly from the perspective of interaction between network elements. It can be understood that, in order to implement the foregoing functions, the terminal and the network device include corresponding hardware structures and/or software units for executing respective functions. Those of ordinary skill in the art will appreciate that units and algorithmic operations of various examples described in connection with implementations herein may be implemented by hardware or by a combination of computer software and hardware. Whether these functions are performed by means of hardware or hardware driven by computer software depends on the application and the design constraints of the associated technical solution. Those skilled in the art may use different methods with regard to each particular application to implement the described functionality, but such methods should not be regarded as lying beyond the scope of the disclosure.

In implementations of the disclosure, division of functional units of the terminal and the network device may be implemented according to the foregoing method implementations. For example, functional units may be divided to correspond to respective functions, or two or more functions may be integrated into one processing unit. The integrated unit may be implemented in a form of hardware, or may be implemented in a form of software program unit. It should be noted that, the division of units in implementations of the disclosure is illustrative and is only a division of logical functions, and other manners of division may also available in practice.

Figure 6:
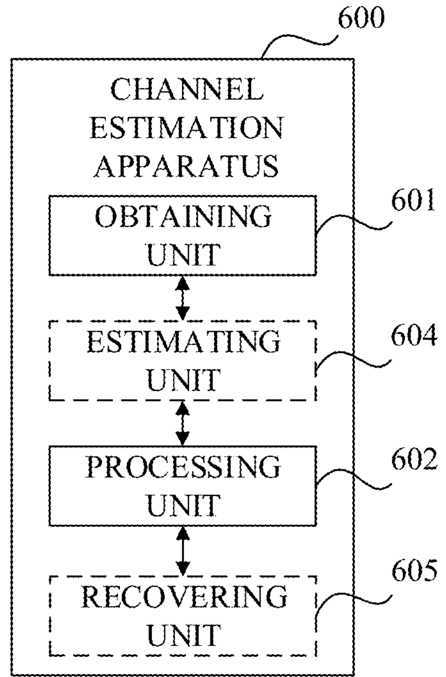
FIG. 6 is a block diagram illustrating functional units of a channel estimation apparatus provided in implementations of the disclosure.

If an integrated unit is adopted, FIG. 6 is a block diagram illustrating possible functional units of an apparatus involved in the foregoing implementations. The channel estimation apparatus 600 includes an obtaining unit 601 and a processing unit 602. The processing unit 602 is configured to control and manage operations of the channel estimation apparatus. For example, the processing unit 602 is configured to support the channel estimation apparatus to execute step 203 in FIG. 2A, step 2031 in FIG. 2B, steps 20212022 in FIG. 2C, step 204 in FIG. 2D, steps 203 to 205 in FIG. 2E, and other procedures for supporting the technology described herein. The obtaining unit 601 is configured to support communication between the apparatus and other devices, for example, a network device. The channel estimation apparatus 600 may further include a storage unit (not illustrated in FIG. 6). The storage unit is configured to store program codes and data of a network device.

The processing unit 602 may be a processor or a controller. The obtaining unit 601 may be a transceiver, a transceiver circuit, a radio frequency (RF) chip, etc. The storage unit may be a memory.

Optionally, the channel estimation apparatus 600 may further include an estimating unit 604. The estimating unit 604 is configured to perform channel estimation of a first channel based on first reference signal, to obtain an initial channel-estimation result.

The estimating unit 604 may be an independent unit, or may be combined with the processing unit 602, which is not limited in the disclosure.

Optionally, the channel estimation apparatus 600 may further include a recovering unit 605. The recovering unit 605 is configured to perform channel recovery based on a channel-estimation result of the first channel, to obtain an initial channel-recovery result. The recovering unit 605 may be an independent unit, or may be combined with the processing unit 602, which is not limited in the disclosure.

When the processing unit 602 is a processor, the obtaining unit 601 is a communication interface, and the storage unit 603 is a memory, the network device involved in implementations of the disclosure may be the electronic device illustrated in FIG. 5A.

Figures 7, 8:
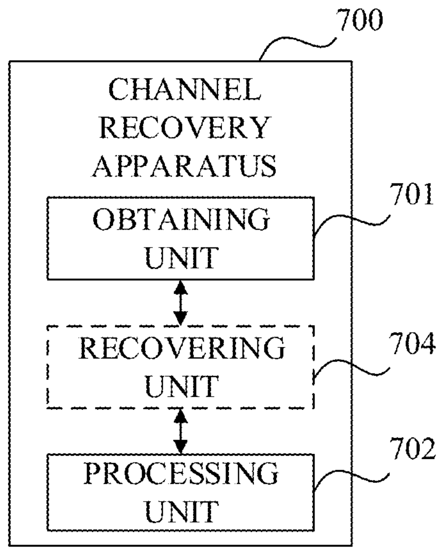
FIG. 7 is a block diagram illustrating functional units of a channel recovery apparatus provided in implementations of the disclosure.
FIG. 8 is a block diagram illustrating functional units of a channel estimation and recovery apparatus provided in implementations of the disclosure.

If an integrated unit is adopted, FIG. 7 is a block diagram illustrating possible functional units of another apparatus involved in the foregoing implementations. The channel recovery apparatus 700 includes a processing unit 702 and an obtaining unit 701. The processing unit 702 is configured to control and manage operations of the channel recovery apparatus. For example, the processing unit 702 is configured to support the channel recovery apparatus to perform step 302 in FIG. 3A, step 3022 in FIG. 3B, step 3021 in FIG. 3C, and/or other procedures used in the technology described herein. The obtaining unit 701 is configured to support communication between the channel recovery apparatus and other devices. The channel recovery apparatus 700 may further include a storage unit (not illustrated in FIG. 7). The storage unit is configured to store program codes and data of a terminal.

The processing unit 702 may be a processor or a controller, and may be, for example, a central processing unit (CPU), a general-purpose processor, a digital signal processor (DSP), an application-specific integrated circuit (ASIC), a field programmable gate array (FPGA), or other programmable logic devices, transistor logic devices, hardware components, or any combination thereof, which can implement or perform various illustrative logic blocks, units, and circuits described in connection with the disclosure. The processor may also be a combination that implements a computing function, for example, a combination that includes one or more microprocessors, a combination of DSP and microprocessor, etc. The obtaining unit 701 may be a transceiver, a transceiver circuit, etc. The storage unit may be a memory.

Optionally, the channel recovery apparatus 700 further includes a recovering unit 704. The recovering unit 704 is configured to perform channel recovery based on a channel-estimation result of a first channel to obtain an initial channel-recovery result. The recovering unit 704 may be an independent unit, or may be combined with the processing unit 702, which is not limited in the disclosure.

When the processing unit 702 is a processor, the obtaining unit 701 is a communication interface, and the storage unit is a memory, the channel recovery apparatus 700 involved in implementations of the disclosure may be the electronic device illustrated in FIG. 5A.

If an integrated unit is adopted, FIG. 8 is a block diagram of possible functional units of another apparatus involved in the foregoing implementations. The channel estimation and recovery apparatus 800 includes an obtaining unit 801 and a processing unit 802. The processing unit 802 is configured to control and manage operations of the channel estimation and recovery apparatus. For example, the processing unit 802 is configured to support an electronic device to perform step 402 in FIG. 4 and/or other procedures for the technology described herein. The obtaining unit 801 is configured to support communication between the channel estimation and recovery apparatus and other devices. The channel estimation and recovery apparatus 800 may further include a storage unit (not illustrated in FIG. 8). The storage unit is configured to store program codes and data of a terminal.

The processing unit 802 may be a processor or a controller, and may be, for example, a CPU, a general-purpose processor, a DSP, an ASIC, an FPGA, or other programmable logic devices, transistor logic devices, hardware components, or any combination thereof, which can implement or perform various illustrative logic blocks, units, and circuits described in connection with the disclosure. The processor may also be a combination that implements a computing function, for example, a combination that includes one or more microprocessors, a combination of DSP and microprocessor, etc. The obtaining unit 801 may be a transceiver, a transceiver circuit, etc. The storage unit may be a memory.

When the processing unit 802 is a processor, the obtaining unit 801 is a communication interface, and the storage unit is a memory, the channel estimation and recovery apparatus 800 involved in implementations of the disclosure may be the electronic device illustrated in FIG. 5A.

Implementations of the disclosure further provide a computer readable storage medium. The computer readable storage medium is configured to store computer programs for electronic data interchange (EDI). The computer programs are operable with a computer to execute some or all of the steps implemented by a receiving end described in the foregoing method implementations.

Implementations of the disclosure further provide a computer program product. The computer program product includes a non-transitory computer-readable storage medium storing computer programs. The computer programs are operable with a computer to execute some or all of the steps implemented by a receiving end described in the foregoing method. The computer program product may be a software installation package.

The steps of the method or algorithm described in implementations of the disclosure may be implemented by means of hardware, or may be implemented by means of software instructions executed by a processor. The software instruction may include a corresponding software module. The software module may be stored in a random access memory (RAM), a flash memory, a read only memory (ROM), an erasable programmable ROM (EPROM), an electrically EPROM (EEPROM), a register, a hard disk, a mobile hard disk, a compact disc-ROM (CD-ROM), or any other form of storage medium well known in the art. An exemplary storage medium is coupled to a processor such that the processor can read information from or write information to the storage medium. The storage medium may also be a part of the processor, and the processor and the storage medium may be located in an ASIC. In addition, the ASIC may be located in an access-network device, a target network device, or a core-network device. The processor and the storage medium may also be present as discrete components in the access-network device, the target network device, or the core-network device.

It can be appreciated by those skilled in the art that, all or some of the above implementations can be implemented through software, hardware, firmware, or any other combination thereof. When implemented by software, all or part of the above implementations can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An artificial intelligence (AI)-based channel estimation method, comprising:

obtaining a first training data set, wherein the first training data set is a plurality of initial channel-estimation results obtained by performing channel estimation multiple times on a first channel;

inputting the first training data set into a first initial estimation model for processing, to obtain predicted channel-estimation results;

inputting the predicted channel-estimation results and nominal parameters of the first channel into a first target function, and calculating a first loss value according to the first target function;

adjusting a parameter of the first initial estimation model to obtain a trained first estimation model, when the first loss value is greater than a first preset loss value;

determining the trained first estimation model as a first AI estimation model, when the first loss value is less than or equal to the first preset loss value;

obtaining a first reference signal, the first reference signal being used for channel estimation of the first channel; and performing channel estimation on the first channel based on the first reference signal, to obtain an initial channel-estimation result; and inputting the initial channel-estimation result into the first AI estimation model for optimization, to obtain a channel-estimation result of the first channel.

2. The method of claim 1, further comprising:

processing the channel-estimation result of the first channel with an AI-based recovery model, to obtain a channel-recovery result, wherein the channel-recovery result indicates a channel-estimation result of a full channel, and the first channel is a subset of the full channel.

3. The method of claim 2, wherein:

before processing the channel-estimation result of the first channel with the AI-based recovery model, the method further comprises:

performing channel recovery based on the channel-estimation result of the first channel to obtain an initial channel-recovery result of the first channel; and the AI-based recovery model is a first AI recovery model, and processing the channel-estimation result of the first channel with the AI-based recovery model comprises:

inputting the initial channel-recovery result into the first AI recovery model for optimization, to obtain the channel-recovery result.

4. The method of claim 3, further comprising:

obtaining a third training data set, wherein the third training data set is a plurality of initial channel-recovery results obtained by performing channel recovery according to the channel-estimation result of the first channel;

inputting the third training data set into a first initial recovery model for processing, to obtain predicted channel-recovery results;

inputting the predicted channel-recovery results and nominal parameters of the full channel into a third target function, and calculating a third loss value according to the third target function;

adjusting a parameter of the first initial recovery model to obtain a trained first recovery model, when the third loss value is greater than a third preset loss value; and determining the trained first recovery model as the first AI recovery model, when the third loss value is less than or equal to the third preset loss value.

5. The method of claim 2, wherein the AI-based recovery model is a second AI recovery model, and processing the channel-estimation result of the first channel with the AI-based recovery model comprises:

inputting the channel-estimation result of the first channel into the second AI recovery model for AI-based channel recovery, to obtain the channel-recovery result.

6. The method of claim 5, further comprising:

obtaining a fourth training data set, wherein the fourth training data set is a plurality of channel-estimation results of the first channel;

inputting the fourth training data set into a second initial recovery model for processing, to obtain predicted channel-recovery results;

inputting the predicted channel-recovery results and nominal parameters of the full channel into a fourth target function, and calculating a fourth loss value according to the fourth target function;

adjusting a parameter of the second initial recovery model to obtain a trained second recovery model, when the fourth loss value is greater than a fourth preset loss value; and determining the trained second recovery model as the second AI recovery model, when the fourth loss value is less than or equal to the fourth preset loss value.

7. An electronic device, comprising:

a transceiver;

a memory storing one or more programs;

a processor configured to executed the one or more programs to:

obtain a first training data set, wherein the first training data set is a plurality of initial channel-estimation results obtained by performing channel estimation multiple times on a first channel;

input the first training data set into a first initial estimation model for processing, to obtain predicted channel-estimation results;

input the predicted channel-estimation results and nominal parameters of the first channel into a first target function, and calculate a first loss value according to the first target function;

adjust a parameter of the first initial estimation model to obtain a trained first estimation model, when the first loss value is greater than a first preset loss value; and determine the trained first estimation model as a first AI estimation model, when the first loss value is less than or equal to the first preset loss value;

cause the transceiver to obtain a first reference signal, the first reference signal being used for channel estimation of the first channel; and perform channel estimation on the first channel based on the first reference signal, to obtain an initial channel-estimation result;

input the initial channel-estimation result into the first AI estimation model for optimization, to obtain a channel-estimation result of the first channel.

8. The electronic device of claim 7, wherein the processor is further configured to:

process the channel-estimation result of the first channel with an AI-based recovery model, to obtain a channel-recovery result, wherein the channel-recovery result indicates a channel-estimation result of a full channel, and the first channel is a subset of the full channel.

9. The electronic device of claim 8, wherein the processor is further configured to:

perform channel recovery based on the channel-estimation result of the first channel to obtain an initial channel-recovery result of the first channel; and input the initial channel-recovery result into a first AI recovery model for optimization, to obtain the channel-recovery result.

10. The electronic device of claim 9, wherein the processor is further configured to:

obtain a third training data set, wherein the third training data set is a plurality of initial channel-recovery results obtained by performing channel recovery according to the channel-estimation result of the first channel;

input the third training data set into a first initial recovery model for processing, to obtain predicted channel-recovery results;

input the predicted channel-recovery results and nominal parameters of the full channel into a third target function, and calculate a third loss value according to the third target function;

adjust a parameter of the first initial recovery model to obtain a trained first recovery model, when the third loss value is greater than a third preset loss value; and determine the trained first recovery model as the first AI recovery model, when the third loss value is less than or equal to the third preset loss value.

11. The electronic device of claim 8, wherein the processor is specifically configured to:

input the channel-estimation result of the first channel into a second AI recovery model for AI-based channel recovery, to obtain the channel-recovery result.

12. The electronic device of claim 11, wherein processing unit is further configure to:

obtain a fourth training data set, wherein the fourth training data set is a plurality of channel-estimation results of the first channel;

input the fourth training data set into a second initial recovery model for processing, to obtain predicted channel-recovery results;

input the predicted channel-recovery results and nominal parameters of the full channel into a fourth target function, and calculate a fourth loss value according to the fourth target function;

adjust a parameter of the second initial recovery model to obtain a trained second recovery model, when the fourth loss value is greater than a fourth preset loss value; and determine the trained second recovery model as the second AI recovery model, when the fourth loss value is less than or equal to the fourth preset loss value.

13. A non-transitory computer-readable storage medium having stored thereon instructions, which when executed by at least one processor, cause the at least one processor to perform operations comprising:

obtaining a first training data set, wherein the first training data set is a plurality of initial channel-estimation results obtained by performing channel estimation multiple times on a first channel;

inputting the first training data set into a first initial estimation model for processing, to obtain predicted channel-estimation results;

inputting the predicted channel-estimation results and nominal parameters of the first channel into a first target function, and calculating a first loss value according to the first target function;

adjusting a parameter of the first initial estimation model to obtain a trained first estimation model, when the first loss value is greater than a first preset loss value; and determining the trained first estimation model as a first AI estimation model, when the first loss value is less than or equal to the first preset loss value;

obtaining a first reference signal, the first reference signal being used for channel estimation of the first channel; and performing channel estimation on the first channel based on the first reference signal, to obtain an initial channel-estimation result; and inputting the initial channel-estimation result into the first AI estimation model for optimization, to obtain a channel-estimation result of the first channel.

14. The non-transitory computer-readable storage medium of claim 13, wherein the at least one processor is further configured to perform:

processing the channel-estimation result of the first channel with an AI-based recovery model, to obtain a channel-recovery result, wherein the channel-recovery result indicates a channel-estimation result of a full channel, and the first channel is a subset of the full channel.

15. The non-transitory computer-readable storage medium of claim 14, wherein:

before processing the channel-estimation result of the first channel with the AI-based recovery model, the at least one processor is further configured to perform:

performing channel recovery based on the channel-estimation result of the first channel to obtain an initial channel-recovery result of the first channel; and the AI-based recovery model is a first AI recovery model, and processing the channel-estimation result of the first channel with the AI-based recovery model comprises:

inputting the initial channel-recovery result into the first AI recovery model for optimization, to obtain the channel-recovery result.

16. The non-transitory computer-readable storage medium of claim 15, wherein the at least one processor is further configured to perform:

obtaining a third training data set, wherein the third training data set is a plurality of initial channel-recovery results obtained by performing channel recovery according to the channel-estimation result of the first channel;

inputting the third training data set into a first initial recovery model for processing, to obtain predicted channel-recovery results;

inputting the predicted channel-recovery results and nominal parameters of the full channel into a third target function, and calculating a third loss value according to the third target function;

adjusting a parameter of the first initial recovery model to obtain a trained first recovery model, when the third loss value is greater than a third preset loss value; and determining the trained first recovery model as the first AI recovery model, when the third loss value is less than or equal to the third preset loss value.

17. The non-transitory computer-readable storage medium of claim 14, wherein the AI-based recovery model is a second AI recovery model, and in terms of processing the channel-estimation result of the first channel with the AI-based recovery model, the at least one processor is configured to perform:

inputting the channel-estimation result of the first channel into the second AI recovery model for AI-based channel recovery, to obtain the channel-recovery result.

* * * * *